US012645478B1

(12) United States Patent
Li et al.

(10) Patent No.: US 12,645,478 B1
(45) Date of Patent: Jun. 2, 2026

(54) IMPLEMENTING DEBUGGING SNAPSHOTS IN A SERVERLESS COMPUTING ENVIRONMENT

(71) Applicant: Amazon Technologies, Inc., Seattle, WA (US)

(72) Inventors: Meiwen Li, Mercer Island, WA (US); Philip Daniel Piwonka, Seattle, WA (US); Christopher Magee Greenwood, Seattle, WA (US); Sushant Bhatia, Kirkland, WA (US)

(73) Assignee: Amazon Technologies, Inc., Seattle, WA (US)

( * ) Notice: Subject to any disclaimer, the term of this patent is extended or adjusted under 35 U.S.C. 154(b) by 860 days.

(21) Appl. No.: 17/935,898

(22) Filed: Sep. 27, 2022

(51) Int. Cl.
G06F 9/455 (2018.01)

(52) U.S. Cl.
CPC .................. G06F 9/45558 (2013.01); G06F 2009/45562 (2013.01); G06F 2009/45575 (2013.01); G06F 2009/45591 (2013.01)

(58) Field of Classification Search
CPC ....... G06F 9/45558; G06F 2009/45562; G06F 2009/45575; G06F 2009/45591
See application file for complete search history.

(56) References Cited

U.S. PATENT DOCUMENTS

| | | | | |
|---|---|---|---|---|
| 10,503,631 | B1 * | 12/2019 | Talluri | G06F 11/3612 |
| 12,360,817 | B1 * | 7/2025 | Sathe | G06F 9/5044 |
| 2011/0225459 | A1 * | 9/2011 | Fahrig | G06F 11/366 |
| | | | | 718/1 |
| 2015/0052400 | A1 * | 2/2015 | Garrett | G06F 11/3656 |
| | | | | 714/37 |
| 2015/0052403 | A1 * | 2/2015 | Garrett | G06F 11/366 |
| | | | | 714/38.11 |
| 2015/0052406 | A1 * | 2/2015 | Garrett | G06F 11/3636 |
| | | | | 714/45 |
| 2015/0143344 | A1 * | 5/2015 | Davis | G06F 11/366 |
| | | | | 717/129 |
| 2017/0300394 | A1 * | 10/2017 | Raut | G06F 11/203 |
| 2018/0004556 | A1 * | 1/2018 | Marriner | G06F 9/445 |
| 2018/0113793 | A1 * | 4/2018 | Fink | G06F 11/3624 |
| 2021/0117308 | A1 * | 4/2021 | Burgos | G06N 20/00 |
| 2021/0326301 | A1 * | 10/2021 | Vutukuri | G06F 16/1734 |
| 2022/0091969 | A1 * | 3/2022 | Han | G06F 8/71 |
| 2022/0091970 | A1 * | 3/2022 | Han | G06F 9/45558 |

* cited by examiner

*Primary Examiner* — Pierre Vital
*Assistant Examiner* — Tuan M Nguyen
(74) *Attorney, Agent, or Firm* — Knobbe, Martens, Olson & Bear, LLP

(57) ABSTRACT

Systems and methods are described for implementing debugging snapshots on a serverless computing system. A serverless computing system executes user-submitted code in sandboxed execution environments such as virtual machines or containers, and the user who requests execution of the code does not have direct access to these execution environments for debugging or other purposes. To support debugging of code, the serverless computing system thus implements a debugging snapshot service that generates snapshots of the environment in which the user-submitted code is executing. Snapshots are generated accordance with criteria that may be specified by the user, and may include any or all of the information needed to resume execution of the code from the point at which the snapshot was taken. The service includes user interfaces that enable inspection and comparison of snapshots, as well as setting snapshot generation and retention policies.

18 Claims, 7 Drawing Sheets

IMPLEMENTING DEBUGGING SNAPSHOTS IN A SERVERLESS COMPUTING ENVIRONMENT

BACKGROUND

Computing devices can utilize communication networks to exchange data. Companies and organizations operate computer networks that interconnect a number of computing devices to support operations or provide services to third parties. The computing systems can be located in a single geographic location or located in multiple, distinct geographic locations (e.g., interconnected via private or public communication networks). Specifically, hosted computing environments or data processing centers, generally referred to herein as "data centers," may include a number of interconnected computing systems to provide computing resources to users of the data center. The data centers may be private data centers operated on behalf of an organization, or public data centers operated on behalf, or for the benefit of, the general public.

To facilitate increased utilization of data center resources, virtualization technologies allow a single physical computing device to host one or more instances of virtual machines that appear and operate as independent computing devices to users of a data center. With virtualization, the single physical computing device can create, maintain, delete, or otherwise manage virtual machines in a dynamic manner. In turn, users can request computing resources from a data center, such as single computing devices or a configuration of networked computing devices, and be provided with varying numbers of virtual machine resources.

In some scenarios, a user can request that a data center provide computing resources to execute a particular task. The task may correspond to a set of computer-executable instructions, which the data center may then execute on behalf of the user. The data center may thus further facilitate increased utilization of data center resources.

BRIEF DESCRIPTION OF THE DRAWINGS

Throughout the drawings, reference numbers may be re-used to indicate correspondence between referenced elements. The drawings are provided to illustrate example embodiments described herein and are not intended to limit the scope of the disclosure.

DETAILED DESCRIPTION

Figure 1A:
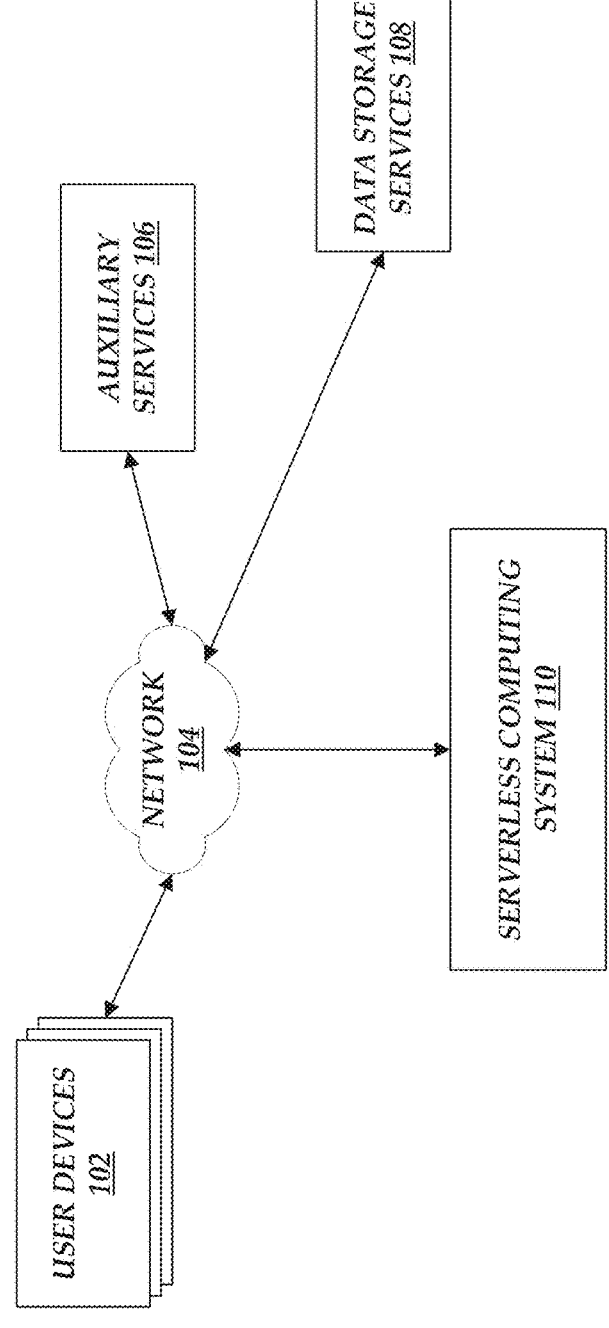
FIGS. 1A and 1B are block diagrams depicting an example operating environment in which a serverless computing system can execute tasks corresponding to code, which may be submitted by users of the serverless computing system, and can generate debugging snapshots in accordance with aspects of the present disclosure.
Figure 1A:

Generally described, aspects of the present disclosure relate to improving the performance of a serverless computing system. More specifically, aspects of the present disclosure relate to implementing debugging snapshots of a virtual machine instance that executes tasks in a serverless computing system, which may facilitate debugging of code and thereby make more efficient use of computing resources by reducing executions of code that do not perform as intended. The implementation of debugging snapshots allows a user to realize the benefits of using serverless computing, such as rapid low-latency code execution in a lightweight environment that the user does not have to maintain, while mitigating the potential drawback that the user does not have direct access to the execution environment and thus cannot use many conventional debugging tools and techniques. The use of debugging snapshots thus provides a bridge to enable debugging in an environment where conventional debugging tools and techniques may not be available or usable.

As described in detail herein, a serverless computing system may provide a network-accessible service enabling users to submit or designate computer-executable code to be executed by virtual machine instances on the serverless computing system. Each set of code on the serverless computing system may define a "task," and may implement specific functionality corresponding to that task when executed on a virtual machine instance of the serverless computing system. Individual implementations of the task on the serverless computing execution system may be referred to as an "execution" of the task (or a "task execution"). The serverless computing system can further enable users to trigger execution of a task based on a variety of potential events, such as detecting new data at a network-based storage system, transmission of an application programming interface ("API") call to the on-demand code execution system, or transmission of a specially formatted hypertext transport protocol ("HTTP") packet to the on-demand code execution system. Thus, users may utilize the serverless computing system to execute any specified executable code "on-demand," without requiring configuration or maintenance of the underlying hardware or infrastructure on which the code is executed. Further, the serverless computing system may be configured to execute tasks in a rapid manner (e.g., in under 100 milliseconds), thus enabling execution of tasks in "real-time" (e.g., with little or no perceptible delay to an end user).

The serverless computing system may thus allow users to execute code in a serverless environment (e.g., one in which the underlying server is not under user control). The term "serverless environment," as used herein, is intended to refer to an environment in which responsibility for managing generation, configuration, and state of an underlying execution environment is abstracted away from a user, such that the user need not, for example, create the execution environment, install an operating system within the execution environment, or manage a state of the environment in order to execute desired code in the environment. Similarly, the term "server-based environment" is intended to refer to an environment in which a user is at least partly responsible for managing generation, configuration, or state of an underlying execution environment in addition to executing desired code in the environment. One skilled in the art will thus appreciate that "serverless" and "server-based" may indicate the degree of user control over execution environments in which code is executed, rather than the actual absence or presence of a server.

As described in more detail below, the serverless computing system may include a worker manager configured to receive user code (threads, programs, etc., composed in any of a variety of programming languages) and cause execution of the code in a highly scalable, low latency manner, without requiring user configuration of a virtual machine instance. Specifically, the worker manager can, prior to receiving the user code and prior to receiving any information from a user regarding any particular virtual machine instance configuration, create and configure virtual machine instances according to a predetermined set of configurations, each corresponding to any one or more of a variety of run-time environments. Thereafter, the worker manager receives user-initiated requests to execute code, and identifies a pre-configured virtual machine instance to execute the code based on configuration information associated with the request. The worker manager can further allocate the identified virtual machine instance to execute the user's code at least partly by creating and configuring containers inside the allocated virtual machine instance, and provisioning the containers with code of the task as well as a dependency code objects. Various embodiments for implementing a worker manager and executing user code on virtual machine instances is described in more detail in U.S. Pat. No. 9,323,556, entitled "PROGRAMMATIC EVENT DETECTION AND MESSAGE GENERATION FOR REQUESTS TO EXECUTE PROGRAM CODE," and filed Sep. 30, 2014 (the "'556 Patent"), the entirety of which is hereby incorporated by reference.

As used herein, the term "virtual machine instance" is intended to refer to an execution of software or other executable code that emulates hardware to provide an environment or platform on which software may execute (an "execution environment"). Virtual machine instances are generally executed by hardware devices, which may differ from the physical hardware emulated by the virtual machine instance. For example, a virtual machine may emulate a first type of processor and memory while being executed on a second type of processor and memory. Thus, virtual machines can be utilized to execute software intended for a first execution environment (e.g., a first operating system) on a physical device that is executing a second execution environment (e.g., a second operating system). In some instances, hardware emulated by a virtual machine instance may be the same or similar to hardware of an underlying device. For example, a device with a first type of processor may implement a plurality of virtual machine instances, each emulating an instance of that first type of processor. Thus, virtual machine instances can be used to divide a device into a number of logical sub-devices (each referred to as a "virtual machine instance"). While virtual machine instances can generally provide a level of abstraction away from the hardware of an underlying physical device, this abstraction is not required. For example, assume a device implements a plurality of virtual machine instances, each of which emulate hardware identical to that provided by the device. Under such a scenario, each virtual machine instance may allow a software application to execute code on the underlying hardware without translation, while maintaining a logical separation between software applications running on other virtual machine instances. This process, which is generally referred to as "native execution," may be utilized to increase the speed or performance of virtual machine instances. Other techniques that allow direct utilization of underlying hardware, such as hardware pass-through techniques, may be used as well.

While a virtual machine instance executing an operating system is described herein as one example of an execution environment, other execution environments are also possible. For example, tasks or other processes may be executed within a software "container," which provides an isolated runtime environment without itself providing virtualization of hardware. Containers may be implemented within virtual machines to provide additional security, or may be run outside of a virtual machine instance.

The serverless computing system may thus include multiple virtual machine instances executing various tasks on behalf of various users. As described above, however, a user of the serverless computing system does not have direct control over, and does not have direct access to, the particular virtual machine instance that is executing a task on behalf of the user. The user's ability to debug code that is executing on a serverless computing system is therefore limited relative to the user's ability to debug code that is executing in a server-based environment, since the user may have direct access to the server-based environment and may execute utilities (e.g., debuggers, integrated development environments, etc.) that allow the user to "walk through" code execution, set breakpoints inspect the execution state of the server at various points during execution, and so forth. A serverless computing system may thus provide the advantage of the user not having to maintain a server or virtual machine instance, but the disadvantage that the user is not able to run debugging tools on a server or instance of the serverless computing system.

To address these issues, an operator of a serverless computing system may implement a debugging snapshot service as described herein. The debugging snapshot service may enable offline (or, in some embodiments, online) debugging of code that is executing in an execution environment of a serverless computing system, by providing snapshots (which, in embodiments where the execution environment is a container, may include or be a checkpoint of the container) of the execution environment at various points in time during execution of a user-submitted task. The user may then inspect the contents of snapshots to verify whether code is performing as intended, and in various embodiments may resume execution of snapshots, compare snapshots taken at different times (during the same execution or a different execution of the task), or otherwise interact with the snapshots to debug and troubleshoot their code. The user may further specify criteria for generating snapshots, which may be applied by the debugging snapshot service to determine whether and when to take snapshots. (It will be understood that the term "criteria" as used herein includes embodiments in which a single criterion is specified as well as embodiments in which there are multiple criteria. It will further understood that, in various embodiments, criteria may be "satisfied" when one of them is satisfied, all of them are satisfied, or various combinations thereof.)

As will be appreciated by one of skill in the art in light of the present disclosure, the embodiments disclosed herein improve the ability of computing systems, such as serverless computing systems, to execute code in an efficient manner. Moreover, the presently disclosed embodiments address technical problems inherent within computing systems; specifically, the problem of debugging code that is executing in an environment for which the user does not have direct access. These technical problems are addressed by the various technical solutions described herein, including the implementation of a debugging snapshot service within a serverless computing system to facilitate debugging and reduce waste of computing resources on executions of code that does not perform as intended. Thus, the present disclosure represents an improvement on existing data processing systems and computing systems in general.

Embodiments of the disclosure will now be described with reference to the accompanying figures, wherein like numerals refer to like elements throughout. The terminology used in the description presented herein is not intended to be interpreted in any limited or restrictive manner, simply because it is being utilized in conjunction with a detailed description of certain specific embodiments of the invention. Furthermore, embodiments of the invention may include several novel features, no single one of which is solely responsible for its desirable attributes or which is essential to practicing the inventions herein described.

FIG. 1A is a block diagram of an illustrative operating environment 100 in which a serverless computing system 110 may operate based on communication with user computing devices 102, auxiliary services 106, and network-based data storage services 108. In general, the user computing devices 102 can be any computing device such as a desktop, laptop or tablet computer, personal computer, wearable computer, server, personal digital assistant (PDA), hybrid PDA/mobile phone, mobile phone, electronic book reader, set-top box, voice command device, camera, digital media player, and the like. The serverless computing system 110 may provide the user computing devices 102 with one or more user interfaces, command-line interfaces (CLIs), application programing interfaces (APIs), and/or other programmatic interfaces for generating and uploading user-executable code (including metadata identifying dependency code objects for the uploaded code), invoking the user-provided code (e.g., submitting a request to execute the user code on the serverless computing system 110), scheduling event-based jobs or timed jobs, tracking the user-provided code, and/or viewing other logging or monitoring information related to their requests and/or user code. As described in more detail below, the serverless computing system 110 may further provide the user computing devices 102 with one or more user interfaces (e.g., the user interfaces 300 and 400 described with reference to FIGS. 3 and 4 below) for interacting with debugging snapshots. Although one or more embodiments may be described herein as using a user interface, it should be appreciated that such embodiments may, additionally or alternatively, use any CLIs, APIs, or other programmatic interfaces.

The illustrative environment 100 further includes one or more network-based data storage services 108, which are configured to enable the serverless computing system 110 to store and retrieve data from one or more persistent or substantially persistent data sources. Illustratively, the network-based data storage services 108 may enable the serverless computing system 110 to store information corresponding to a task, such as code or metadata, to store additional code objects representing dependencies of tasks, to retrieve data to be processed during execution of a task, and to store information (e.g., results) regarding that execution. The network-based data storage services 108 may represent, for example, a relational or non-relational database. In another example, the network-based data storage services 108 may represent a network-attached storage (NAS), configured to provide access to data arranged as a file system. The network-based data storage services 108 may further enable the serverless computing system 110 to query for and retrieve information regarding data stored within the serverless computing system 110, such as by querying for a number of relevant files or records, sizes of those files or records, file or record names, file or record creation times, etc. In some instances, the network-based data storage services 108 may provide additional functionality, such as the ability to separate data into logical groups (e.g., groups associated with individual accounts, etc.). While shown as distinct from the auxiliary services 106, the network-based data storage services 108 may in some instances also represent a type of auxiliary service 106.

The user computing devices 102, auxiliary services 106, and network-based data storage services 108 may communicate with the serverless computing system 110 via a network 104, which may include any wired network, wireless network, or combination thereof. For example, the network 104 may be a personal area network, local area network, wide area network, over-the-air broadcast network (e.g., for radio or television), cable network, satellite network, cellular telephone network, or combination thereof. As a further example, the network 104 may be a publicly accessible network of linked networks, possibly operated by various distinct parties, such as the Internet. In some embodiments, the network 104 may be a private or semi-private network, such as a corporate or university intranet. The network 104 may include one or more wireless networks, such as a Global System for Mobile Communications (GSM) network, a Code Division Multiple Access (CDMA) network, a Long Term Evolution (LTE) network, or any other type of wireless network. The network 104 can use protocols and components for communicating via the Internet or any of the other aforementioned types of networks. For example, the protocols used by the network 104 may include Hypertext Transfer Protocol (HTTP), HTTP Secure (HTTPS), Message Queue Telemetry Transport (MQTT), Constrained Application Protocol (CoAP), and the like. Protocols and components for communicating via the Internet or any of the other aforementioned types of communication networks are well known to those skilled in the art and, thus, are not described in more detail herein.

In the example of FIG. 1A, the serverless computing system 110 is illustrated as connected to the network 104. In some embodiments, any of the components within the serverless computing system 110 can communicate with other components of the serverless computing system 110 via the network 104. In other embodiments, not all components of the serverless computing system 110 are capable of communicating with other components of the operating environment 100. In one example, only the frontend 120 depicted in FIG. 1B (which may in some instances represent multiple frontends 120) may be connected to the network 104, and other components of the serverless computing system 110 may communicate with other components of the environment 100 via the frontends 120.

In FIG. 1A, users, by way of user computing devices 102, may interact with the serverless computing system 110 to provide executable code, and establish rules or logic defining when and how such code should be executed on the serverless computing system 110, thus establishing a "task." For example, a user may wish to run a piece of code in connection with a web or mobile application that the user has developed. One way of running the code would be to acquire virtual machine instances from service providers who provide infrastructure as a service, configure the virtual machine instances to suit the user's needs, and use the configured virtual machine instances to run the code. In order to avoid the complexity of this process, the user may alternatively provide the code to the serverless computing system 110, and request that the serverless computing system 110 execute the code. The serverless computing system 110 can handle the acquisition and configuration of compute capacity (e.g., containers, instances, etc., which are described in greater detail below) based on the code execution request, and execute the code using the compute capacity. The serverless computing system 110 may automatically scale up and down based on the volume, thereby relieving the user from the burden of having to worry about over-utilization (e.g., acquiring too little computing resources and suffering performance issues) or under-utilization (e.g., acquiring more computing resources than necessary to run the codes, and thus overpaying). In accordance with embodiments of the present disclosure, and as described in more detail below, the serverless computing system 110 may configure the virtual machine instances with customized operating systems to execute the user's code more efficiency and reduce utilization of computing resources.

Figure 1B:
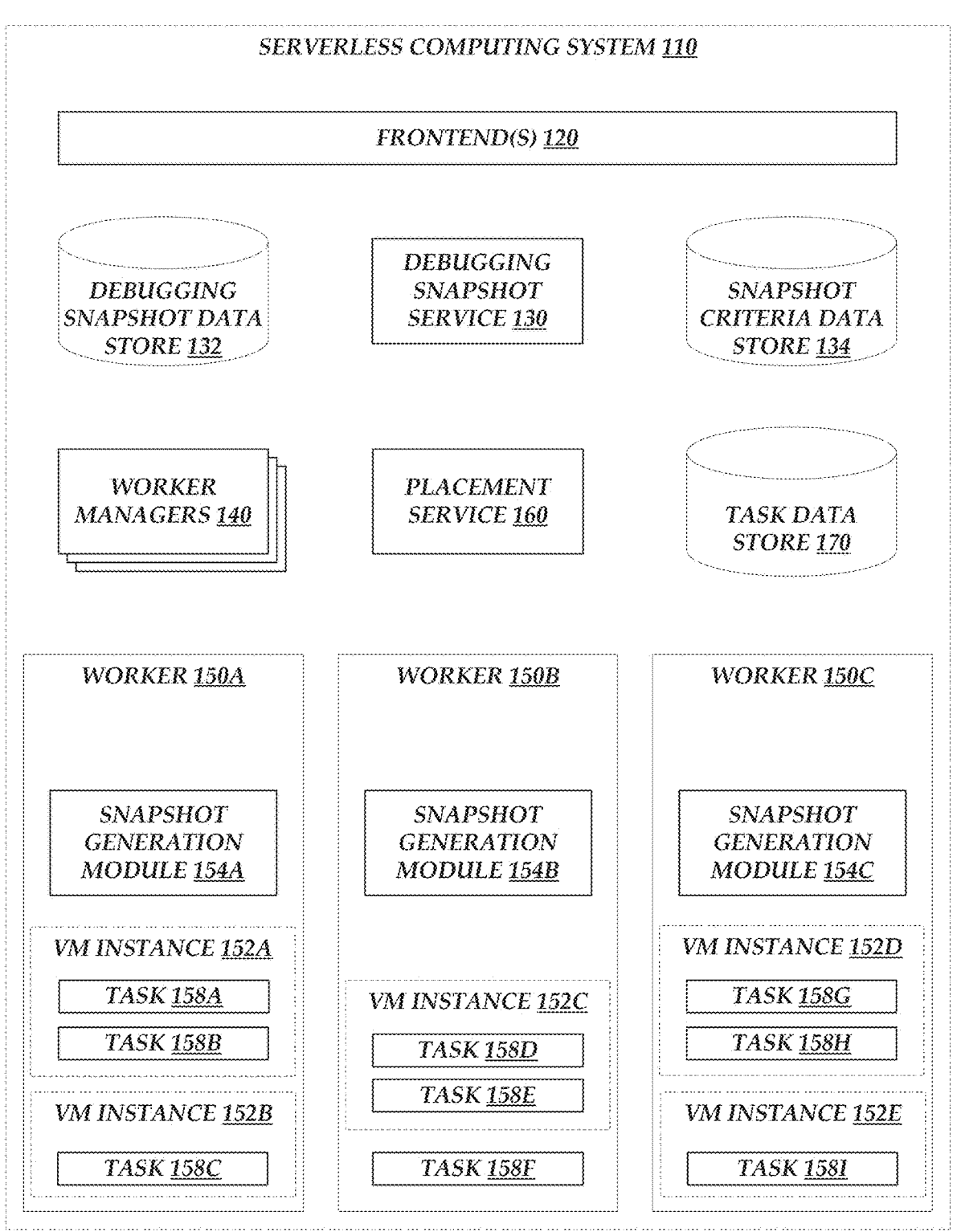

With reference now to FIG. 1B, the serverless computing system 110 is depicted as operating in a distributed computing environment including several computer systems that are interconnected using one or more computer networks (not shown in FIG. 1B). The serverless computing system 110 could also operate within a computing environment having a fewer or greater number of devices than are illustrated in FIG. 1B. Thus, the depiction of the serverless computing system 110 in FIG. 1B should be taken as illustrative and not limiting to the present disclosure. For example, the serverless computing system 110 or various constituents thereof could implement various Web services components, hosted or "cloud" computing environments, and/or peer to peer network configurations to implement at least a portion of the processes described herein.

Further, the serverless computing system 110 may be implemented directly in hardware or software executed by hardware devices and may, for instance, include one or more physical or virtual servers implemented on physical computer hardware configured to execute computer executable instructions for performing various features that will be described herein. The one or more servers may be geographically dispersed or geographically co-located, for instance, in one or more data centers. In some instances, the one or more servers may operate as part of a system of rapidly provisioned and released computing resources, often referred to as a "cloud computing environment."

To enable interaction with the serverless computing system 110, the system 110 includes one or more frontends 120, which enable interaction with the serverless computing system 110. In an illustrative embodiment, the frontends 120 serve as a "front door" to the other services provided by the serverless computing system 110, enabling users (via user computing devices 102) to provide, request execution of, and view results of computer executable code. The frontends 120 include a variety of components to enable interaction between the serverless computing system 110 and other computing devices. For example, each frontend 120 may include a request interface providing user computing devices 102 with the ability to upload or otherwise communication user-specified code to the serverless computing system 110 and to thereafter request execution of that code. In one embodiment, the request interface communicates with external computing devices (e.g., user computing devices 102, auxiliary services 106, etc.) via a graphical user interface (GUI), CLI, or API. The frontends 120 process the requests and makes sure that the requests are properly authorized. For example, the frontends 120 may determine whether the user associated with the request is authorized to access the user code specified in the request.

References to user code as used herein may refer to any program code (e.g., a program, routine, subroutine, thread, etc.) written in a specific program language. In the present disclosure, the terms "code," "user code," and "program code," may be used interchangeably. Such user code may be executed to achieve a specific function, for example, in connection with a particular web application or mobile application developed by the user. As noted above, individual collections of user code (e.g., to achieve a specific function) are referred to herein as "tasks," while specific executions of that code (including, e.g., compiling code, interpreting code, or otherwise making the code executable) are referred to as "task executions" or simply "executions." Tasks may be written, by way of non-limiting example, in JavaScript (e.g., node.js), Java, Python, and/or Ruby (and/or another programming language). Tasks may be "triggered" for execution on the serverless computing system 110 in a variety of manners. In one embodiment, a user or other computing device may transmit a request to execute a task may, which can generally be referred to as "call" to execute of the task. Such calls may include the user code (or the location thereof) to be executed and one or more arguments to be used for executing the user code. For example, a call may provide the user code of a task along with the request to execute the task. In another example, a call may identify a previously uploaded task by its name or an identifier. In yet another example, code corresponding to a task may be included in a call for the task, as well as being uploaded in a separate location (e.g., storage of an auxiliary service 106 or a storage system internal to the serverless computing system 110) prior to the request being received by the serverless computing system 110. As noted above, the code for a task may reference additional code objects maintained at the serverless computing system 110 by use of identifiers of those code objects, such that the code objects are combined with the code of a task in an execution environment prior to execution of the task. The serverless computing system 110 may vary its execution strategy for a task based on where the code of the task is available at the time a call for the task is processed. A request interface of the frontend 120 may receive calls to execute tasks as Hypertext Transfer Protocol Secure (HTTPS) requests from a user. Also, any information (e.g., headers and parameters) included in the HTTPS request may also be processed and utilized when executing a task. As discussed above, any other protocols, including, for example, HTTP, MQTT, and CoAP, may be used to transfer the message containing a task call to the request interface.

Prior to calling for execution of a task, an end user may submit (e.g., to a frontend 120) code for the task and associated data to be used to execute the task. In one embodiment, the code is provided in the form of a disk image containing the code and other data that the code may use during execution. Illustratively, creation of a task may result in the frontend 120 creating metadata for the task, which defines for example the user creating the task, the disk image used to facilitate execution of the task, trigger conditions for the function, and the like. In one embodiment, task may be versioned, with task metadata identifying the available versions and at least some other metadata for a task may vary across versions. For example, different versions may be associated with different disk images. Task data and metadata is illustratively stored in the task data store 170. The task data store 170 may correspond to any persistent data store. In one embodiment, the task data store 170 is implemented as logical storage on a cloud storage service, such as an object storage system. An example of such an object storage system is AMAZON™'s SIMPLE STOR-AGE SERVICE™ (or "S3™"). In accordance with embodiments of the present disclosure, user-submitted code may correspond to tasks for conducting stream data processing.

A call to execute a task may specify one or more third-party libraries (including native libraries) to be used along with the user code corresponding to the task. In one embodiment, the call may provide to the serverless computing system 110 a file containing the user code and any libraries (and/or identifications of storage locations thereof) corresponding to the task requested for execution. In some embodiments, the call includes metadata that indicates the program code of the task to be executed, the language in which the program code is written, the user associated with the call, and/or the computing resources (e.g., memory, etc.) to be reserved for executing the program code. For example, the program code of a task may be provided with the call, previously uploaded by the user, provided by the serverless computing system 110 (e.g., standard routines), and/or provided by third parties. Illustratively, code not included within a call or previously uploaded by the user may be referenced within metadata of the task by use of a URI associated with the code. In some embodiments, such resource-level constraints (e.g., how much memory is to be allocated for executing a particular user code) are specified for the particular task, and may not vary over each execution of the task. In such cases, the serverless computing system 110 may have access to such resource-level constraints before each individual call is received, and the individual call may not specify such resource-level constraints. In some embodiments, the call may specify other constraints such as permission data that indicates what kind of permissions or authorities that the call invokes to execute the task. Such permission data may be used by the serverless computing system 110 to access private resources (e.g., on a private network). In some embodiments, individual code objects may also be associated with permissions or authorizations. For example, a third party may submit a code object and designate the object as readable by only a subset of users. The serverless computing system 110 may include functionality to enforce these permissions or authorizations with respect to code objects.

In some embodiments, a call may specify the behavior that should be adopted for handling the call. In such embodiments, the call may include an indicator for enabling one or more execution modes in which to execute the task referenced in the call. For example, the call may include a flag or a header for indicating whether the task should be executed in a debug mode in which the debugging and/or logging output that may be generated in connection with the execution of the task is provided back to the user (e.g., via a console user interface). In such an example, the serverless computing system 110 may inspect the call and look for the flag or the header, and if it is present, the serverless computing system 110 may modify the behavior (e.g., logging facilities) of the container in which the task is executed, and cause the output data to be provided back to the user. In some embodiments, the behavior/mode indicators are added to the call by the user interface provided to the user by the serverless computing system 110. Other features such as source code profiling, remote debugging, and/or the taking of debugging snapshots as described herein may also be enabled or disabled based on the indication provided in a call.

To manage requests for code execution, the frontend 120 can include an execution queue (not shown in FIG. 1B), which can maintain a record of requested task executions. Illustratively, the number of simultaneous task executions by the serverless computing system 110 is limited, and as such, new task executions initiated at the serverless computing system 110 (e.g., via an API call, via a call from an executed or executing task, etc.) may be placed on the execution queue and processed, e.g., in a first-in-first-out order. In some embodiments, the serverless computing system 110 may include multiple execution queues, such as individual execution queues for each user account. For example, users of the serverless computing system 110 may desire to limit the rate of task executions on the serverless computing system 110 (e.g., for cost reasons). Thus, the serverless computing system 110 may utilize an account-specific execution queue to throttle the rate of simultaneous task executions by a specific user account. In some instances, the serverless computing system 110 may prioritize task executions, such that task executions of specific accounts or of specified priorities bypass or are prioritized within the execution queue. In other instances, the serverless computing system 110 may execute tasks immediately or substantially immediately after receiving a call for that task, and thus, the execution queue may be omitted.

As noted above, tasks may be triggered for execution at the serverless computing system 110 based on explicit calls from user computing devices 102 (e.g., as received at the request interface). Alternatively or additionally, tasks may be triggered for execution at the serverless computing system 110 based on data retrieved from one or more auxiliary services 106 or network-based data storage services 108. To facilitate interaction with auxiliary services 106, the frontend 120 can include a polling interface (not shown in FIG. 1B), which operates to poll auxiliary services 106 or data storage services 108 for data. Illustratively, the polling interface may periodically transmit a request to one or more user-specified auxiliary services 106 or data storage services 108 to retrieve any newly available data (e.g., social network "posts," news articles, files, records, etc.), and to determine whether that data corresponds to a user-established criteria triggering execution a task on the serverless computing system 110. Illustratively, criteria for execution of a task may include, but is not limited to, whether new data is available at the auxiliary services 106 or data storage services 108, the type or content of the data, or timing information corresponding to the data. In some instances, the auxiliary services 106 or data storage services 108 may function to notify the frontend 120 of the availability of new data, and thus the polling service may be unnecessary with respect to such services.

In addition to tasks executed based on explicit user calls and data from auxiliary services 106, the serverless computing system 110 may in some instances operate to trigger execution of tasks independently. For example, the serverless computing system 110 may operate (based on instructions from a user) to trigger execution of a task at each of a number of specified time intervals (e.g., every 10 minutes).

The frontend 120 can further include an output interface (not shown in FIG. 1B) configured to output information regarding the execution of tasks on the serverless computing system 110. Illustratively, the output interface may transmit data regarding task executions (e.g., results of a task, errors related to the task execution, or details of the task execution, such as total time required to complete the execution, total data processed via the execution, etc.) to the user computing devices 102 or to auxiliary services 106, which may include, for example, billing or logging services. The output interface may further enable transmission of data, such as service calls, to auxiliary services 106. For example, the output interface may be utilized during execution of a task to transmit an API request to an external service 106 (e.g., to store data generated during execution of the task).

In some embodiments, the serverless computing system 110 may include multiple frontends 120. In such embodiments, a load balancer (not shown in FIG. 1B) may be provided to distribute the incoming calls to the multiple frontends 120, for example, in a round-robin fashion. In some embodiments, the manner in which the load balancer distributes incoming calls to the multiple frontends 120 may be based on the location or state of other components of the serverless computing system 110. For example, a load balancer may distribute calls to a geographically nearby frontend 120, or to a frontend with capacity to service the call. In instances where each frontend 120 corresponds to an individual instance of another component of the on-demand code execution system, such as the active pool described below, the load balancer may distribute calls according to the capacities or loads on those other components. As will be described in more detail below, calls may in some instances be distributed between frontends 120 deterministically, such that a given call to execute a task will always (or almost always) be routed to the same frontend 120. This may, for example, assist in maintaining an accurate execution record for a task, to ensure that the task executes only a desired number of times. While distribution of calls via a load balancer is illustratively described, other distribution techniques, such as anycast routing, will be apparent to those of skill in the art.

In the illustrated embodiment, the serverless computing system 110 further includes a debugging snapshot service 130, which is described in more detail with reference to FIG. 6 below. As described in more detail below, the debugging snapshot service 130 communicates with the frontend(s) 120, snapshot generation modules 154A-F, debugging snapshot data store 132, and snapshot criteria data store 134 to implement aspects of the present disclosure, including the generation of debugging snapshots and their presentation to users. The data stores 132 and 134 may generally be any non-transient computer-readable data store, such as a hard drive, solid state device, magnetic medium, database, storage service, or other device or service. In some embodiments, the data stores 132 and/or 134 may be implemented on or as part of the data storage services 108 or auxiliary services 106.

To execute tasks, the serverless computing system 110 includes one or more worker managers 140 that manage the execution environments used for servicing incoming calls to execute tasks. In the example illustrated in FIG. 1B, each worker manager 140 "leases" a particular set of execution environments implemented by workers 150A-C. Each worker 150A-C is illustratively a host device configured to host multiple execution environments, which in FIG. 1B are virtual machine instances 152A-E. Execution environments may alternatively include software containers, sometimes referred to as "OS-level virtualization," another virtualization technology known in the art. Thus, where references are made herein to virtual machine instances 152A-E, it should be understood that (unless indication is made to the contrary) a container may be substituted for such instances 152A-E.

The virtual machine instances 152A-E and workers 150A-C may further include language runtimes, code libraries, or other supporting functions (not depicted in FIG. 1B)

that facilitate execution of user-submitted code 158A-I. The workers 150A-C and the virtual machine instances 152A-E may further include operating systems, which in various embodiments may be the same operating system, variants of the same operating system, different operating systems, or combinations thereof.

The workers 150A-C may further include snapshot generation modules 154A-C, which may generate debugging snapshots for individual execution environments as described herein. In some embodiments, the snapshot generation modules 154A-C may apply criteria obtained (directly or indirectly) from the snapshot criteria data store 134 to determine whether and when to generate a debugging snapshot. In other embodiments, determining whether and when to generate a debugging snapshot may be implemented by the workers 150A-C and/or the virtual machine instances 152A-E, which may then invoke the snapshot generation modules 154A-C to generate the debugging snapshot. In some embodiments, some determinations of whether and when to generate a snapshot of a virtual machine instance 152A-E may be performed by a worker 150A-C, or some determinations of whether and when to generate a snapshot of an execution environment may be performed by a worker manager 140. For example, the worker manager 140 may invoke snapshot generation module 154A to generate snapshots of tasks executing on a worker 150A that is about to go out of service. Additionally, in some embodiments, all or part of the functionality associated with the snapshot generation modules 154A-C (e.g., monitoring execution of the task to determine whether a criterion has been satisfied) may be implemented within the virtual machine instances 152A-E.

Once a triggering event to execute a task has been successfully processed by a frontend 120, the frontend 120 passes a request to a worker manager 140 to execute the task. In one embodiment, each frontend 120 may be associated with a corresponding worker manager 140 (e.g., a worker manager 140 co-located or geographically nearby to the frontend 120) and thus the frontend 120 may pass most or all requests to that worker manager 140. In another embodiment, a frontend 120 may include a location selector configured to determine a worker manager 140 to which to pass the execution request. In one embodiment, the location selector may determine the worker manager 140 to receive a call based on hashing the call, and distributing the call to a worker manager 140 selected based on the hashed value (e.g., via a hash ring). Various other mechanisms for distributing calls between worker managers 140 will be apparent to one of skill in the art.

As shown in FIG. 1B, various combinations and configurations of workers 150A-C and virtual machine instances 152A-E may be used to facilitate execution of user submitted code 158A-I. In the illustrated example, the worker 150A implements two virtual machine instances 152A and 152B. Virtual machine instance 152A serves as an execution environment for user-submitted codes 158A and 158B, and virtual machine instance 152B serves as an execution environment for user-submitted code 158C. The worker 150B further implements a virtual machine instance 152C and directly provides an execution environment for user-submitted code 158F. The virtual machine instance 152C, in turn, serves as an execution environment for user-submitted codes 158D and 158E. It will be understood that these embodiments are illustrated for purposes of example, and that many other embodiments are within the scope of the present disclosure.

While some functionalities are generally described herein with reference to an individual component of the serverless computing system 110, other components or a combination of components may additionally or alternatively implement such functionalities. For example, a worker manager 140 or a frontend 120 may operate to provide functionality associated with generating debugging snapshots as described herein with reference to the debugging snapshot service 130.

Figure 2:
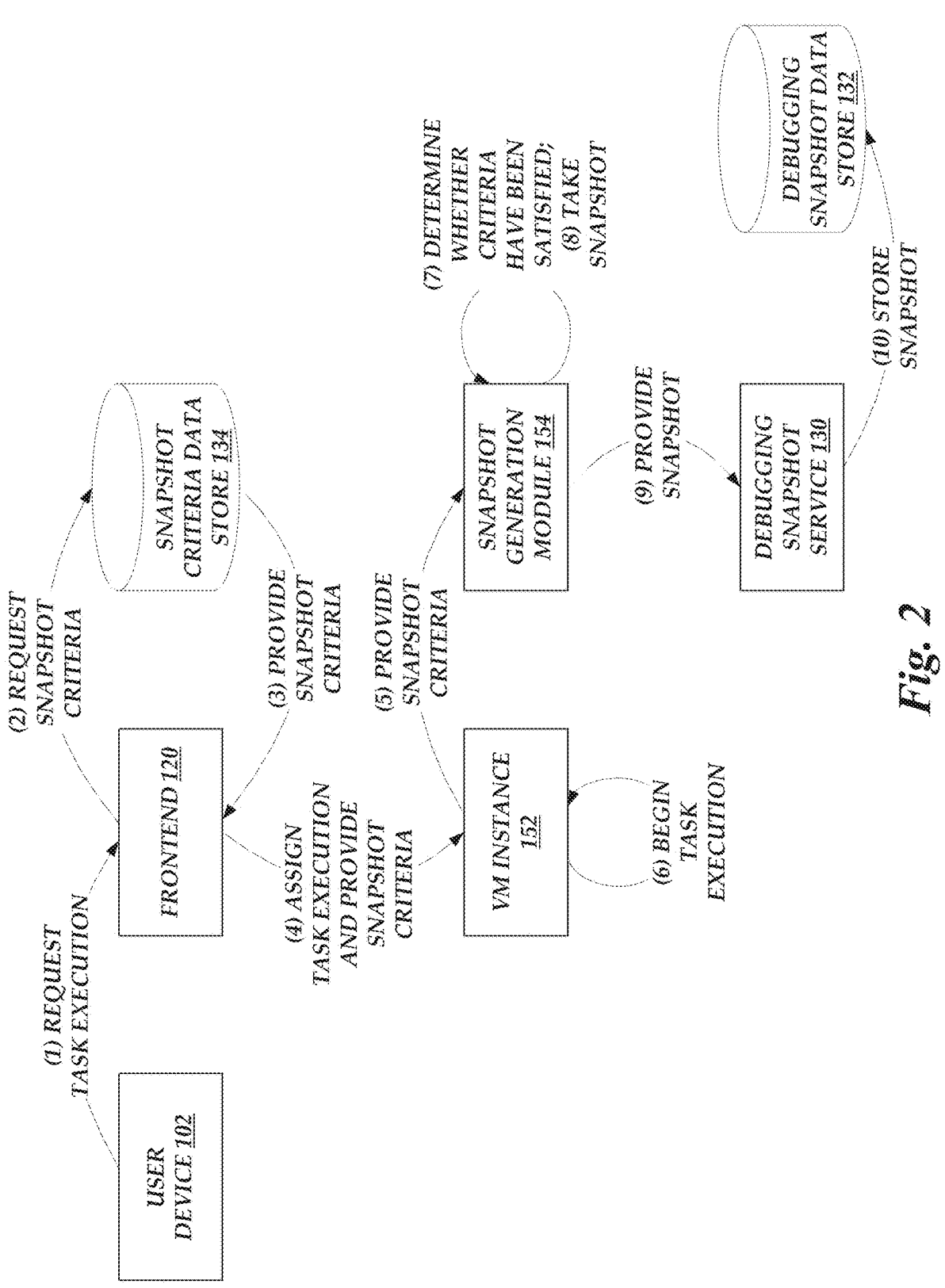
FIG. 2 is a flow diagram depicting example interactions for generating debugging snapshots in a serverless computing environment in accordance with aspects of the present disclosure.

FIG. 2 depicts example interactions for generating and storing debugging snapshots in accordance with aspects of the present disclosure. As discussed above, the example interactions may allow a serverless computing system to reduce waste of computing resources by facilitating identification and correction of code that is not performing as intended when that code is executing in an environment to which the user has limited or no access, and thus cannot debug or otherwise troubleshoot issues with the code using conventional techniques that rely on the user having access to the execution environment. The example interactions thus allow a user to obtain a debugging snapshot of the execution environment, which, as described in more detail below, can be inspected by the user to facilitate debugging and troubleshooting issues with the code.

The example interactions begin at (1), where a user computing device 102 may transmit a request to execute a task on a serverless computing system to a frontend 120 of the serverless computing system. In some embodiments, as discussed above, a triggering event other than a user request may trigger execution of a task on the serverless computing system. For example, a task may be executed periodically, in response to network activity or other input, or otherwise invoked. In some embodiments, the request transmitted at (1) may include user-specified criteria for taking debugging snapshots, in which case the interactions at (2) and (3) may be omitted. In other embodiments, the user computing device 102 may have previously transmitted user-specified criteria for taking debugging snapshots (which may be stored in the snapshot criteria data store 134), or the frontend 120 may obtain default criteria in the absence of user-specified criteria or may obtain criteria from a previous execution of the requested task. In such embodiments, at (2), the frontend 120 requests snapshot criteria from the snapshot criteria data store 134, which at (3) provides the requested snapshot criteria. The snapshot criteria may specify, for example, that a specified line of code has been (or is about to be) executed, a handled or unhandled exception has been thrown, the task has ceased execution (exiting normally or with an error code), a specified event occurred (e.g., network activity), specified input has been received, the task has executed for a specified duration, or other conditions.

At (4), the frontend 120 assigns execution of the task to an execution environment as described above, and provides the criteria for generating snapshots to the execution environment. In FIG. 2, the selected execution environment is a virtual machine instance 152. It will be understood, however, that the execution environment may be any of the environments depicted in FIG. 1B and/or described herein, including physical computing devices, containers, and the like. It will further be understood that the frontend 120 may interact with other components of the serverless computing system (e.g., the worker managers 140) to select the execution environment, and that the execution environment may be selected and/or sized based on the task, such that the execution environment contains not significantly more than the minimum amount of resources needed to execute the task itself. The execution environment may thus have insufficient resources to execute conventional debugging tools in addition to executing the task itself.

At (5), the virtual machine instance 152 (or other execution environment) provides the snapshot criteria to a snapshot generation module 154. In some embodiments, as depicted in FIG. 1B, the snapshot generation module 154 is a component within a worker that monitors execution of the task and applies the criteria to determine whether and when to generate a snapshot or snapshots. In other embodiments, the snapshot generation module 154 may reside fully or partially inside the virtual machine instance 152. For example, some task monitoring functionality (e.g., monitoring that a task has ceased execution or exited abnormally) may be implemented by a process that executes within the virtual machine instance 152, and this internal process may signal an external process to generate a debugging snapshot of the virtual machine instance 152. As a further example, an internal process may capture configuration information or other data regarding the virtual machine instance 152 for inclusion in a snapshot.

At (6), the virtual machine instance 152 begins executing the user-submitted code that corresponds to the task whose execution was requested at (1). At (7), the snapshot generation module 154 determines whether the criteria for generating a debugging snapshot have been satisfied. For example, the snapshot generation module 154 may determine that a breakpoint in the code has been reached, that an exception has been thrown and was not handled, that a network connection has been made, or other events have occurred. In various embodiments, the interaction at (7) may be carried out iteratively, periodically, continuously, or at other schedules during execution of the user-submitted code, may be triggered by events that occur during execution of the user-submitted code (e.g., reaching a particular line of code, a variable being set to a particular value, etc.), may be triggered by normal or abnormal termination of the code execution, or may be triggered by other events (e.g., network activity, reading or writing to a storage device, etc.) that occur within the serverless computing system.

If the interaction at (7) leads to a determination that the criteria have been satisfied, then at (8) the snapshot generation module 154 generates a debugging snapshot of the virtual machine instance 152. In some embodiments (e.g., embodiments where all or part of the interaction at (7) is carried out by a process internal to the virtual machine instance 152), a signal may be generated and transmitted to the snapshot generation module 154 to trigger generation of the snapshot. The snapshot may contain, for example, the contents of memory or data stores associated with the virtual machine instance 152, execution state of the code executing in the virtual machine instance 152, values of CPU registers or program variables, information regarding network connections, or other information that enables debugging. In some embodiments, the snapshot may include any and all information needed to resume execution of the task from the point at which the snapshot was taken. At (9), the snapshot generation module 154 provides the debugging snapshot to the debugging snapshot service 130, which at (10) stores it in the debugging snapshot data store 132.

In some embodiments, execution of the task may be terminated or suspended when the snapshot generation criteria are satisfied. For example, the criteria may be that a particular line of code was reached during execution of the task, and the request may specify that execution should be terminated or suspended if and when this line of code is reached. In other embodiments, criteria may be satisfied multiple times during execution of the task and the interactions at (7), (8), (9), and (10) may be carried out multiple times. In further embodiments, as described in more detail below, the number of snapshots generated may be rate-limited or limited to a certain number or percentage (e.g., generate a snapshot every tenth time the criteria are satisfied, generate no more than three snapshots within a ten-minute interval, etc.), and the interactions at (8), (9), and (10) may be carried out accordingly.

It will be understood that FIG. 2 is provided for purposes of example, and that many variations on the depicted interactions are within the scope of the present disclosure. For example, the interactions at (5) and (6) may be carried out in any order or in parallel. As a further example, as described above, the interaction at (1) may be omitted and the execution of a task may be triggered by an event rather than a user request. FIG. 2 is thus understood to be illustrative and not limiting.

Figure 3:
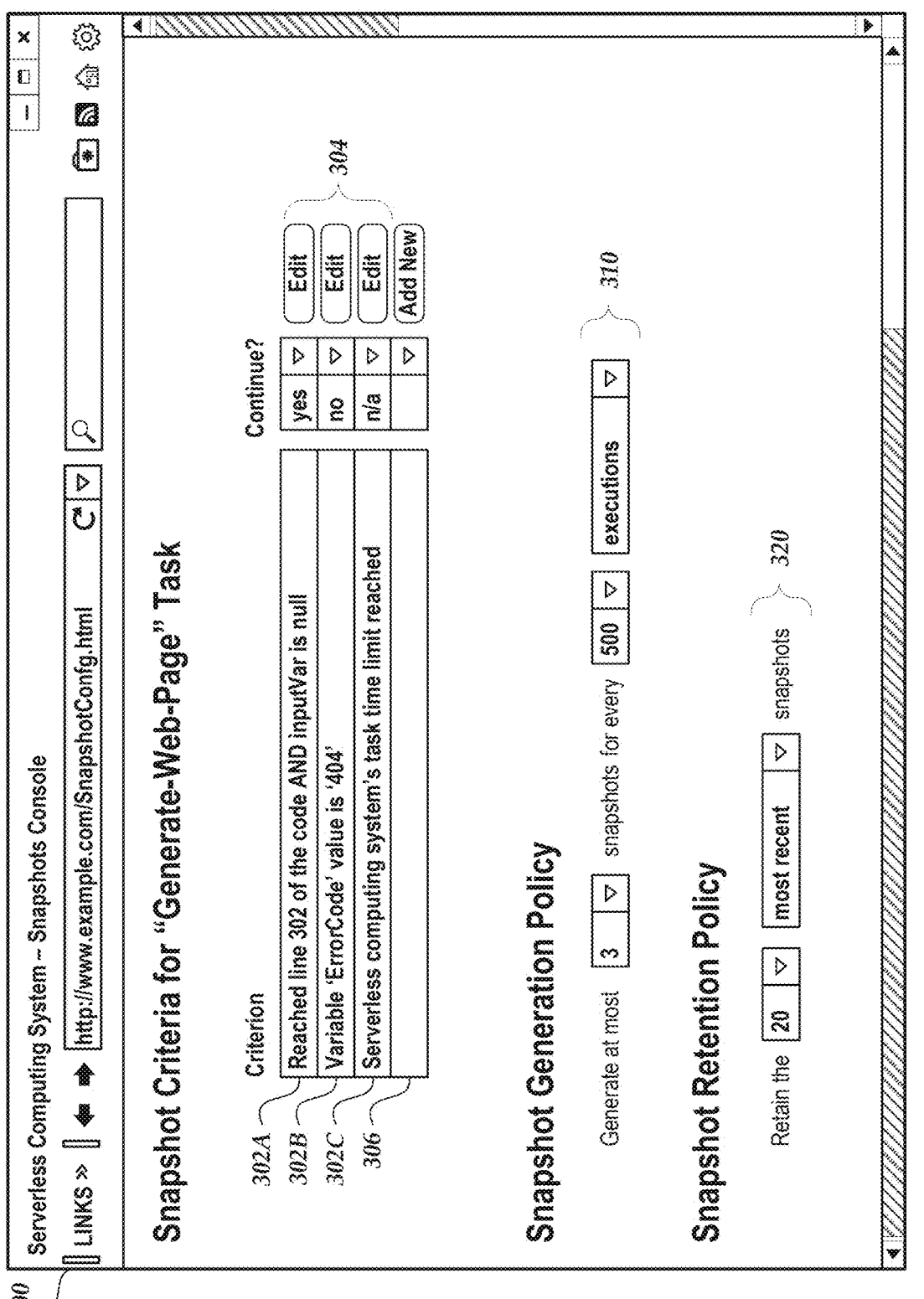
FIG. 3 is a pictorial diagram of an example user interface for configuring generation of debugging snapshots in accordance with aspects of the present disclosure.

FIG. 3 is a pictorial diagram of an example user interface 300 that enables user configuration of snapshot generation for a particular task in accordance with aspects of the present disclosure. The user interface 300 may be generated, for example, by the frontend 120 depicted in FIG. 1B using information obtained from the debugging snapshot service 130. In the depicted example, the user interface 300 includes criteria 302A-C, which may be specified by a user as criteria that, if satisfied, should trigger generation of a debugging snapshot when the task named "Generate-Web-Page" is being executed. In some embodiments, a particular criterion 302A may require satisfaction of more than one condition, and may specify that execution of the "Generate-Web-Page" task should continue after the snapshot is generated. In other embodiments, a criterion 302B may specify that execution of the task should be suspended or terminated if the criterion is satisfied. As discussed in more detail below with reference to FIG. 4, the snapshot generation service may, in some embodiments, enable continuing execution of a task from the point at which a snapshot is taken, and may provide controls that allow the user to specify whether the task should do so. Illustratively, a user may continue execution of a task from the point at which a snapshot is taken for purposes other than debugging. For example, the user may specify a criterion 302C to trigger generation of a debugging snapshot when a user task has been executing for the maximum length of time that the serverless computing system permits for a single task, and then may continue execution of the same code in a new task by resuming from the point at which the snapshot was taken. In other embodiments, the user may inspect a snapshot for debugging purposes and then resume execution of that snapshot to observe the results. The user interface 300 may also include editing controls 304 that enable editing of existing criteria, as well as data entry controls 306 for creating new criteria.

In some embodiments, the user interface 300 may further include controls 310 for inputting a snapshot generation policy. The snapshot generation policy may impose higher-level limits on how often snapshots are generated, how many are generated within a particular timeframe or for a given number of executions of the task, and so forth. For example, the user may input a snapshot generation policy that specifies at most three snapshots should be generated for every 500 executions of the user-submitted code. As a further example, the user may input a snapshot generation policy that specifies at most ten snapshots per hour. In some embodiments, the user may specify whether snapshots should be taken at specific intervals (e.g., every 100th execution) or randomly (e.g., randomly selecting 1/100th of executions).

The user interface 300 may also include controls 320 for inputting a snapshot retention policy. The snapshot retention policy may specify, for example, that the 20 most recent snapshots of the "Generate-Web-Page" task should be retained, and that older snapshots should be discarded as newer snapshots are taken. As further examples, the retention policy may specify that a maximum of 40 snapshots should be retained across all of the user's tasks, that no more than three snapshots a day should be retained, or other such policies.

It will be understood that FIG. 3 is provided for purposes of example, and that many variations on the depicted user interface 300 are within the scope of the present disclosure. For example, the user interface 300 may include a list of debugging snapshots that are currently available under the generation and retention policies that are in effect, or may indicate how many and which snapshots would be discarded by a proposed change in the snapshot retention policy. FIG. 3 is thus understood to be illustrative and not limiting.

Figure 4:
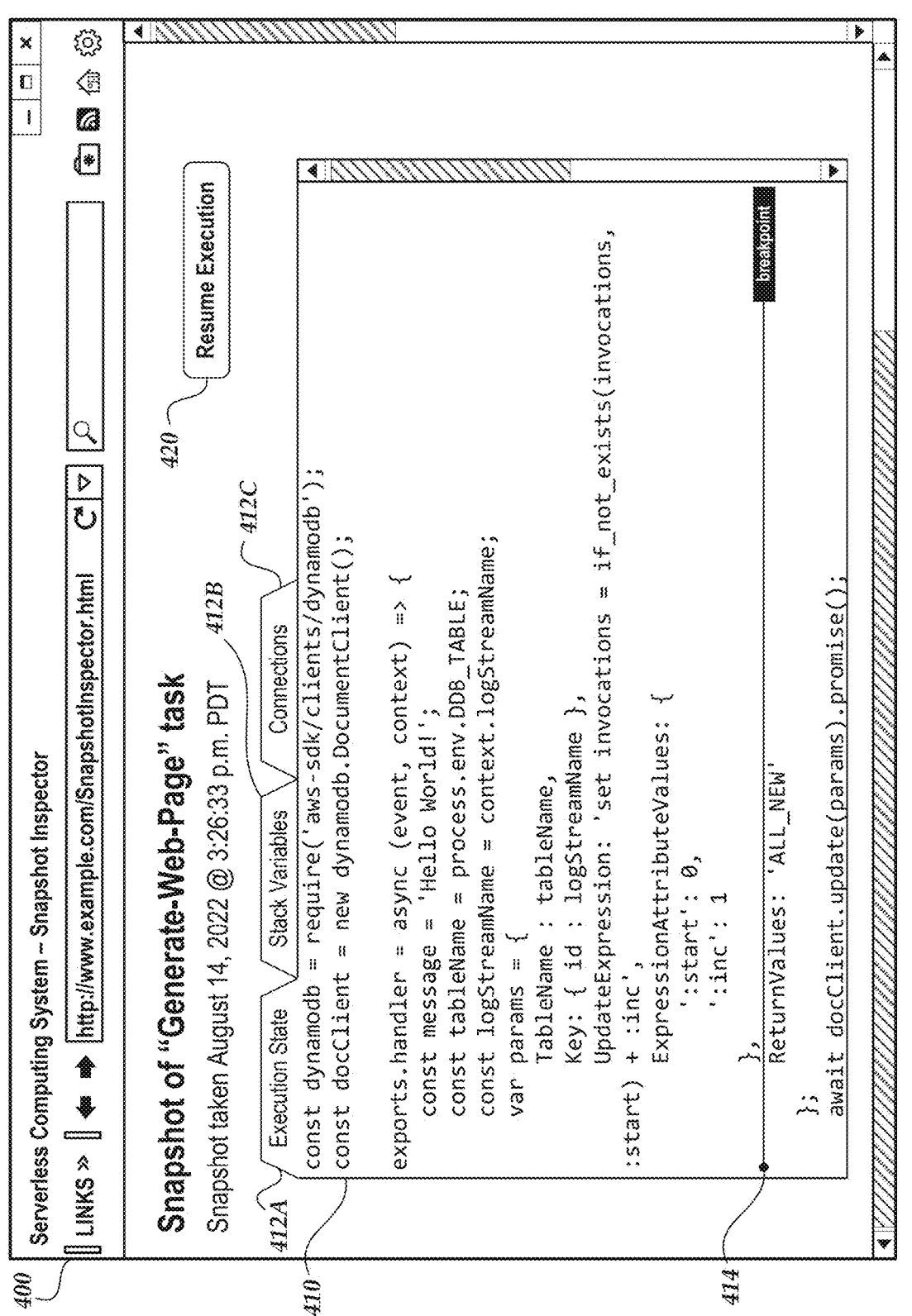
FIG. 4 is a pictorial diagram of an example user interface for inspecting and interacting with a debugging snapshot in accordance with aspects of the present disclosure.

FIG. 4 is a pictorial diagram of an example user interface 400 for inspecting a debugging snapshot in accordance with aspects of the present disclosure. The user interface 400 may be generated, for example, by the frontend 120 depicted in FIG. 1B using information obtained from the using information obtained from the debugging snapshot service 130. In the depicted example, the user interface 400 includes a tab panel 410, which in turn includes tabs 412A-C that contain information from a particular debugging snapshot. The information may include, for example, a breakpoint indicator 414 indicating the line of code that was being executed (or had just been executed) when the snapshot was generated. In some embodiments, the breakpoint indicator 414 may correspond to a criterion that was satisfied (e.g., by reaching the line of code in question). Other tabs 412B-C of the tab panel 410 may include contents of variables, network connections, contents of memory or data stores, stack traces, or other debugging information.

In some embodiments, the debugging snapshot may be stored in a data store (e.g., the debugging snapshot data store 132) and may be fully or partially retrieved and/or parsed by the debugging snapshot service 130 order to display snapshot information via the user interface 400. The debugging snapshot may, in some embodiments, be encrypted or otherwise subjected to access control to prevent unauthorized users from viewing its contents. The user may thus access the content of the debugging snapshot without needing to download the snapshot and without needing to implement a replica of the execution environment from which it was generated in order to run debugging tools or parse the snapshot. The user interface 400 may thus replicate functionality of an offline debugging environment and various debugging tools without requiring the user to provide or maintain such an environment or tools, and may thus extend the efficiency of using serverless computing to further include serverless debugging by making use of debugging snapshots as described herein.

The user interface 400 may further include a resume button 420, which may allow the user to resume execution of the specified task from the point at which the debugging snapshot was generated. In some embodiments, the execution environment from which the snapshot was generated may be "frozen" and maintained in a suspended execution state for a short duration (e.g., a few minutes) while the user inspects the debugging snapshot, and then may resume execution from the point at which it was interrupted. In further embodiments, the user interface 400 may display a countdown timer or other information indicating that the user has a limited amount of time in which to inspect the snapshot before the option of resuming execution lapses. The user interface 400 may thus provide debugging capabilities that are not implemented or that cannot be implemented in the execution environment (e.g., because the execution environments in a serverless computing system may be sized or selected to provide as close to the minimum resources needed to execute a given task as possible). In other embodiments (or, in embodiments where the execution environment is "frozen" for a limited duration, after that duration has elapsed), the original execution environment may be released to the worker manager and made available for execution of other tasks. Invoking the resume button 420 may thus cause a new execution environment to be configured in accordance with the snapshot, such that the execution state, memory contents, register variables, stack, CPU registers, filesystem, configuration and/or other status of the new execution environment correspond to their counterparts in the original execution environment. In some embodiments, resuming execution of the task may include restoring network connections or other execution states in effect at the time the snapshot was taken. For example, the user may include a subroutine in the user-submitted code that establishes or re-establishes network connections, and may indicate that this subroutine should be invoked when resuming execution of a task from a snapshot.

In some embodiments, the user interface 400 may include controls for comparing one debugging snapshot to another. These controls may highlight, for example, changes in the values assigned to variables, changes to the contents of memory or a data store, or other differences between the snapshots. In further embodiments, the controls may enable comparing snapshots taken at the same breakpoint but during different executions of the task.

It will be understood that FIG. 4 is provided for purposes of example, and that many variations on the depicted user interface 400 are within the scope of the present disclosure. For example, the user interface 400 may include controls that display timestamped log files generated during execution of the task and indicate which log entries were made before and after the snapshot was generated. As a further example, the user interface 400 may identify that the content of a particular snapshot is different than other snapshots generated in response to the same criterion being satisfied. FIG. 4 is thus understood to be illustrative and not limiting.

Figure 5:
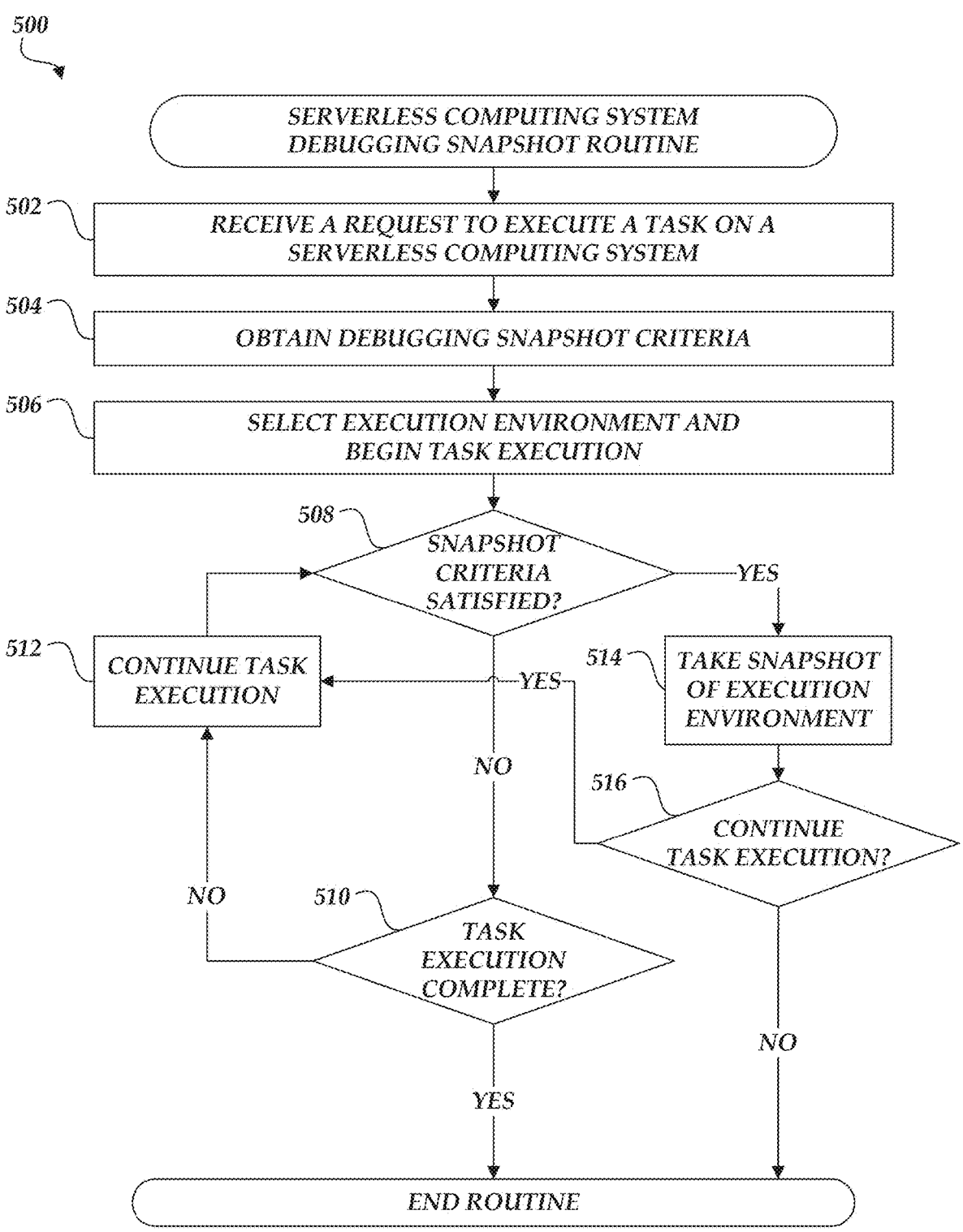
FIG. 5 is a flow chart depicting an example routine for generating debugging snapshots in a serverless computing environment in accordance with aspects of the present disclosure.

FIG. 5 is a flow chart depicting an example routine 500 for generating debugging snapshots in accordance with aspects of the present disclosure. The routine 500 may be carried out, for example, by individual snapshot generation modules 154A-C depicted in FIG. 1B. The routine 500 begins at block 502, where a request to execute a task on a serverless computing system may be received. In some embodiments, as described above, an event other than receiving a request may trigger execution of a task on the serverless computing system, in which case the event may instead be received at block 502.

At block 504, criteria indicating whether and/or when a debugging snapshot should be generated may be obtained. In some embodiments, the criteria may be obtained from the request to execute the task, in which case blocks 502 and 504 may be combined. In other embodiments, as described above, the criteria may be obtained from a data store (e.g., the snapshot criteria data store 134) or from a previous execution of the requested task.

At block 506, an execution environment may be selected and the requested task may begin execution in that environment. In some embodiments, the execution environment may be selected based on its ability to generate debugging snapshots, or may be configured for snapshot generation in response to a task execution request that may generate a debugging snapshot. For example, some execution environments of the serverless computing system may be preconfigured with snapshot generation modules, and task execution requests that are associated with debugging snapshot criteria may be assigned to these execution environments. As a further example, a worker manager that is handling the task execution may request that a placement service facilitate placing the task in an execution environment that is configured to generate debugging snapshots. In further embodiments, particular worker managers and/or workers may be associated with the debugging snapshot service, either on a temporary or long-term basis, and these worker managers and/or workers may be utilized at block 506.

After the task begins execution, at decision block 508, a determination may be made as to whether one or more of the criteria obtained at block 504 have been satisfied during execution of the task in the execution environment (or, in embodiments where one of the criteria is that the task has completed execution, whether the task has done so). If the determination is that one or more of the criteria have been satisfied, then the routine 500 branches to block 514, where a debugging snapshot may be generated and the execution state of the task (and/or the state of the execution environment) may be captured. As described in more detail above, the debugging snapshot may capture information needed to debug the task execution as well as information needed to resume execution of the task at a later time (and, in some embodiments, in a different execution environment).

At decision block 516, a determination may be made as to whether execution of the task should continue after generation of this snapshot. Illustratively, as described above, the user may specify on a per-criterion basis whether execution should continue after a particular criterion is satisfied and a snapshot taken. If the determination at decision block 516 is that execution of the task should continue, then the routine 500 branches to block 512, where execution of the task continues. The routine 500 then returns to decision block 508 and iteratively tests whether any of the criteria for generating a snapshot have further been satisfied. If the determination at decision block 516 is instead that task execution should not continue after the snapshot is taken, then the routine 500 terminates.

If the determination at decision block 508 is that the criteria for generating a debugging snapshot have not been satisfied, then at decision block 510 a determination is made as to whether the task has completed execution. If not, then the routine 500 branches to block 512, where execution of the task may continue, and then iteratively carries out decision blocks 508 and 510 while the task continues until either a snapshot criterion is satisfied (which causes blocks 514 and 516 to be carried out as described above) or the task execution is completed. When the determination at decision block 510 is that the task execution is complete, the routine 500 terminates.

It will be understood that FIG. 5 is provided for purposes of example, and that many variations on the depicted routine 500 are within the scope of the present disclosure. For example, blocks 504 and 506 may be carried out in either order or in parallel. Similarly, decision blocks 508 and 510 may be carried out in either order or in parallel. FIG. 5 is thus understood to be illustrative and not limiting.

Figure 6:
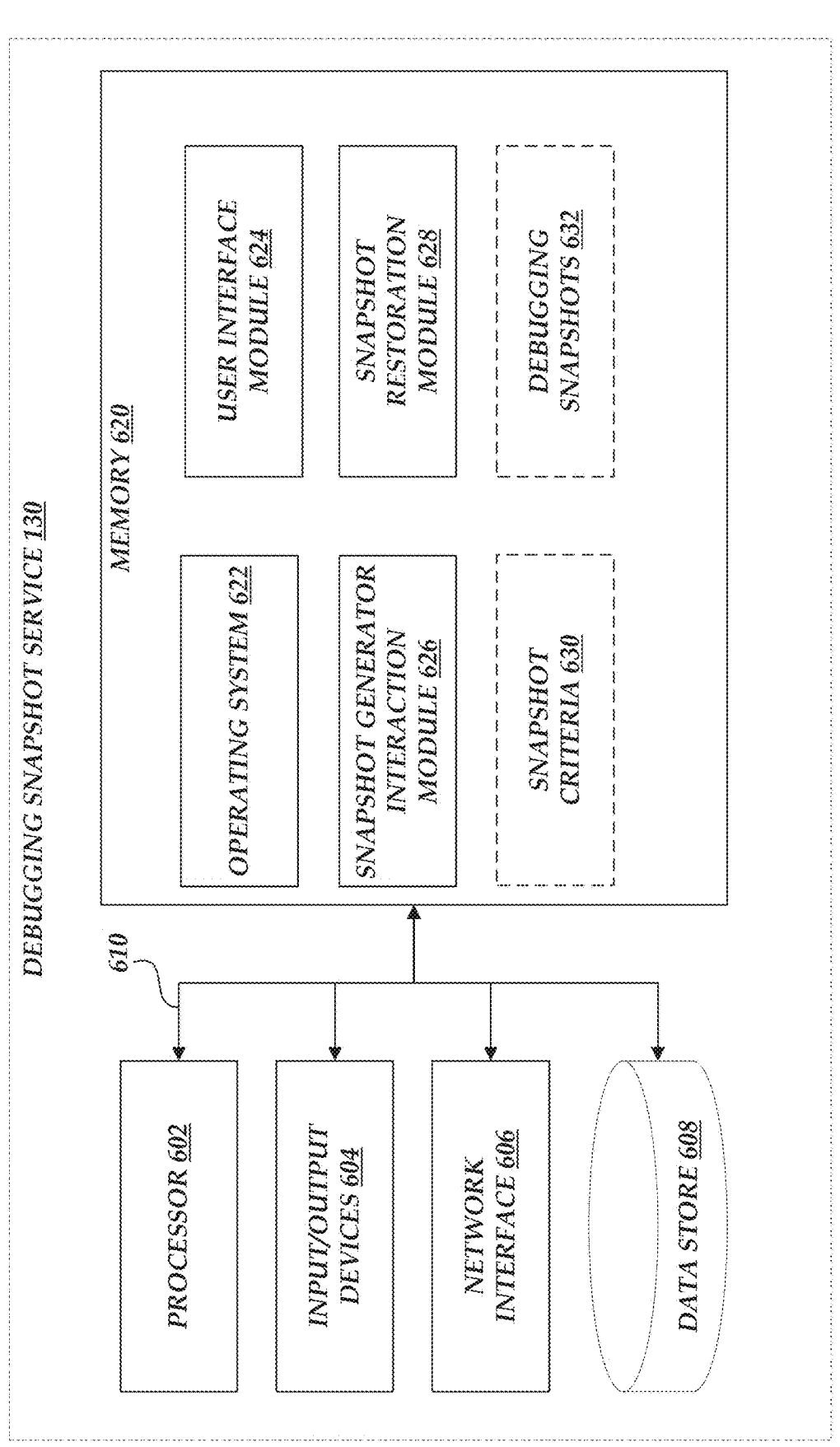
FIG. 6 depicts a general architecture of a computing device that is configured to manage debugging snapshots in a serverless computing environment in accordance with aspects of the present disclosure.

FIG. 6 depicts a general architecture of a computing system (referenced as debugging snapshot service 130) that operates to manage debugging snapshot generation and interaction within the serverless computing system 110. The general architecture of the debugging snapshot service 130 depicted in FIG. 6 includes an arrangement of computer hardware and software modules that may be used to implement aspects of the present disclosure. The hardware modules may be implemented with physical electronic devices, as discussed in greater detail below. The debugging snapshot service 130 may include many more (or fewer) elements than those shown in FIG. 6. It is not necessary, however, that all of these generally conventional elements be shown in order to provide an enabling disclosure. Additionally, the general architecture illustrated in FIG. 6 may be used to implement one or more of the other components illustrated in FIGS. 1A-B.

As illustrated, the debugging snapshot service 130 includes a processor 602, input/output device interfaces 604, a network interface 606, and a data store 608, all of which may communicate with one another by way of a communication bus 610. The network interface 606 may provide connectivity to one or more networks or computing systems. The processor 602 may thus receive information and instructions from other computing systems or services via the network 104. The processor 602 may also communicate to and from a memory 620 and further provide output information for an optional display (not shown) via the input/output device interfaces 604. The input/output device interfaces 604 may also accept input from an optional input device (not shown).

The memory 620 may contain computer program instructions (grouped as modules in some embodiments) that the processor 602 executes in order to implement one or more aspects of the present disclosure. The memory 620 generally includes random access memory (RAM), read only memory (ROM) and/or other persistent, auxiliary or non-transitory computer readable media. The memory 620 may store an operating system 622 that provides computer program instructions for use by the processor 602 in the general administration and operation of the debugging snapshot service 130. The memory 620 may further include computer program instructions and other information for implementing aspects of the present disclosure. For example, in one embodiment, the memory 620 includes a user interface module 624 that generates interfaces (and/or instructions therefor) for interacting with the frontends 120, worker managers 140, or other computing devices, e.g., via an API, CLI, and/or Web interface. Such interface may include, for example, the interfaces 300 and 400 depicted in FIGS. 3 and 4 respectively. In addition, the memory 620 may include and/or communicate with one or more data repositories (not shown), for example, to access user program codes and/or libraries.

In addition to and/or in combination with the user interface module 624, the memory 620 may include a snapshot generator interaction module 626 and a snapshot restoration module 628 that may be executed by the processor 602 to implement various aspects of the present disclosure. In one embodiment, the snapshot generator interaction module 626 may transmit criteria to snapshot generation modules and receive snapshots from them in return. In another embodiments, the snapshot restoration module 628 may facilitate reloading a snapshot into an execution environment, restoring network connections and other execution states, and resuming execution from the point at which the snapshot was taken. Reloading the snapshot may include, for example, loading memory content, filesystem content, CPU registers, variables, or other configuration information into a virtual machine instance such that execution of a task that uses and modifies these resources may resume. While the snapshot generator interaction module 626 and snapshot restoration module 628 shown in FIG. 6 as part of the debugging snapshot service 130, in other embodiments, all or a portion of the snapshot generator interaction module 626 and snapshot restoration module 628 may be implemented by other components of the serverless computing system 110 and/or another computing device. For example, in certain embodiments of the present disclosure, another computing device in communication with the serverless computing system 110 may include several modules or components that operate similarly to the modules and components illustrated as part of the debugging snapshot service 130.

The memory 620 may further include snapshot criteria 630 and debugging snapshots 632, which may be loaded into the memory 620 in conjunction with transmitting and receiving information from the snapshot generator modules. (The snapshot criteria 630 and debugging snapshots 632 are depicted with broken lines in FIG. 6 to distinguish them as data. Elements that provide computer program instructions executable by the processor 602, such as the operating system 622, are depicted with solid lines.) In some embodiments, the memory 620 may further include, e.g., snapshot generation policies, snapshot retention policies, or other information used to manage generation, storage, and/or display of debugging snapshots.

In some embodiments, the debugging snapshot service 130 may further include components other than those illustrated in FIG. 6. For example, the memory 620 may further include information regarding pending requests to execute user-submitted tasks or other information that facilitates managing debugging snapshots. FIG. 6 is thus understood to be illustrative but not limiting.

It is to be understood that not necessarily all objects or advantages may be achieved in accordance with any particular embodiment described herein. Thus, for example, those skilled in the art will recognize that certain embodiments may be configured to operate in a manner that achieves or optimizes one advantage or group of advantages as taught herein without necessarily achieving other objects or advantages as may be taught or suggested herein.

All of the processes described herein may be embodied in, and fully automated via, software code modules, including one or more specific computer-executable instructions, that are executed by a computing system. The computing system may include one or more computers or processors. The code modules may be stored in any type of non-transitory computer-readable medium or other computer storage device. Some or all the methods may be embodied in specialized computer hardware.

Many other variations than those described herein will be apparent from this disclosure. For example, depending on the embodiment, certain acts, events, or functions of any of the algorithms described herein can be performed in a different sequence, can be added, merged, or left out altogether (e.g., not all described acts or events are necessary for the practice of the algorithms). Moreover, in certain embodiments, acts or events can be performed concurrently, e.g., through multi-threaded processing, interrupt processing, or multiple processors or processor cores or on other parallel architectures, rather than sequentially. In addition, different tasks or processes can be performed by different machines and/or computing systems that can function together.

The various illustrative logical blocks and modules described in connection with the embodiments disclosed herein can be implemented or performed by a machine, such as a processing unit or processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A processor can be a microprocessor, but in the alternative, the processor can be a controller, microcontroller, or state machine, combinations of the same, or the like. A processor can include electrical circuitry configured to process computer-executable instructions. In another embodiment, a processor includes an FPGA or other programmable device that performs logic operations without processing computer-executable instructions. A processor can also be implemented as a combination of computing devices, e.g., a combination of a DSP and a microprocessor, a plurality of microprocessors, one or more microprocessors in conjunction with a DSP core, or any other such configuration. Although described herein primarily with respect to digital technology, a processor may also include primarily analog components. A computing environment can include any type of computer system, including, but not limited to, a computer system based on a microprocessor, a mainframe computer, a digital signal processor, a portable computing device, a device controller, or a computational engine within an appliance, to name a few.

Conditional language such as, among others, "can," "could," "might," or "may," unless specifically stated otherwise, are otherwise understood within the context as used in general to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without user input or prompting, whether these features, elements and/or steps are included or are to be performed in any particular embodiment.

Disjunctive language such as the phrase "at least one of X, Y, or Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain embodiments require at least one of X, at least one of Y, or at least one of Z to each be present.

Any process descriptions, elements or blocks in the flow diagrams described herein and/or depicted in the attached figures should be understood as potentially representing modules, segments, or portions of code which include one or more executable instructions for implementing specific logical functions or elements in the process. Alternate implementations are included within the scope of the embodiments described herein in which elements or functions may be deleted, executed out of order from that shown, or discussed, including substantially concurrently or in reverse order, depending on the functionality involved as would be understood by those skilled in the art.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B, and C" can include a first processor configured to carry out recitation A working in conjunction with a second processor configured to carry out recitations B and C.

What is claimed is:

1. A system comprising:
a data store configured to store computer-executable instructions; and
one or more processors in communication with the data store, wherein the computer-executable instructions, when executed by the one or more processors, configure the one or more processors to perform operations including:
receiving a task execution request to execute a task on a serverless computing system;
obtaining a criterion for generating a debugging snapshot;
in response to the task execution request, initiating execution of the task in a virtual machine instance of the serverless computing system;
determining, based at least in part on the execution of the task, that the criterion for generating a debugging snapshot has been satisfied;
generating a snapshot of the virtual machine instance as the debugging snapshot;
suspending execution of the task in the virtual machine instance;
causing display of a user interface, the user interface including first controls that enable user inspection of the debugging snapshot and at least one second control requesting resumption of execution of the task;
for at least a threshold period of time, maintaining resources associated with execution of the task in the virtual machine instance;
subsequent to the threshold period of time elapsing:
releasing the virtual machine instance;
obtaining an input to the at least one second control requesting resumption of execution of the task;
configuring a second virtual machine instance according to the snapshot; and
in response to the input being received subsequent to the threshold period of time elapsing, resuming execution of the task in the second virtual machine instance configured according to the snapshot.

2. The system of claim 1, wherein the debugging snapshot captures an execution state that includes one or more of memory content, filesystem content, CPU registers, variables, network connections, or configuration information.

3. The system of claim 1, wherein the criterion comprises one or more of reaching a specified line of code, throwing an unhandled exception, the task ceasing execution, a variable satisfying a threshold, a specified event occurring, receiving specified input, or the task executing for a threshold duration.

4. The system of claim 1, wherein the user interface includes further controls that enable resuming execution of the task by restoring the debugging snapshot.

5. The system of claim 4, wherein resuming execution of the task includes restoring at least one network connection established during the execution of the task.

6. A computer-implemented method comprising:
obtaining one or more criteria for generating a debugging snapshot, the debugging snapshot associated with executing a task on a serverless computing system;
initiating execution of the task in an execution environment of the serverless computing system;

determining, based at least in part on the execution of the task, that the one or more criteria for generating the debugging snapshot have been satisfied;

generating the debugging snapshot, wherein the debugging snapshot includes at least a portion of an execution state of the execution environment;

suspending execution of the task in the execution environment;

causing display of a user interface, the user interface including first controls that enable user inspection of the debugging snapshot and at least one second control requesting resumption of the execution of the task;

for at least a threshold period of time, maintaining resources associated with execution of the task in the execution environment;

subsequent to the threshold period of time elapsing:

releasing the execution environment;

obtaining an input to the at least one second control requesting resumption of execution of the task;

configuring a second execution environment instance according to the debugging snapshot; and in response to the input being received subsequent to the threshold period of time elapsing, resuming execution of the task in the second execution environment instance configured according to the debugging snapshot.

7. The computer-implemented method of claim 6, wherein the one or more criteria are obtained from a request to execute the task on the serverless computing system.

8. The computer-implemented method of claim 6, wherein the one or more criteria are obtained from a previous execution of the task on the serverless computing system.

9. The computer-implemented method of claim 6, wherein the execution environment comprises a container, and wherein the debugging snapshot comprises a checkpoint of the container.

10. The computer-implemented method of claim 6, wherein the one or more criteria include a quantity of debugging snapshots to generate for executions of the task.

11. The computer-implemented method of claim 6, wherein the user interface enables interaction with a plurality of debugging snapshots.

12. The computer-implemented method of claim 11, wherein the user interface enables comparisons between individual snapshots of the plurality of debugging snapshots.

13. The computer-implemented method of claim 11, wherein the user interface identifies a first snapshot of the plurality of debugging snapshots as containing different content than other snapshots of the plurality of debugging snapshots.

14. The computer-implemented method of claim 6, wherein the user interface enables specifying a snapshot retention policy.

15. One or more non-transitory computer-readable media including computer-executable instructions that, when executed by one or more processors, cause the one or more processors to perform operations including:

initiating execution of a task in an execution environment of a serverless computing system;

determining, based at least in part on the execution of the task, that one or more criteria for generating a debugging snapshot have been satisfied;

generating the debugging snapshot, wherein the debugging snapshot includes at least a portion of an execution state of the execution environment;

suspending execution of the task in the execution environment;

causing display of a user interface, the user interface including first controls that that enable user inspection of the debugging snapshot and at least one second control requesting resumption of execution of the task;

for at least a threshold period of time, maintaining resources associated with execution of the task in the execution environment;

subsequent to the threshold period of time elapsing:

releasing the execution environment;

obtaining an input to the at least one second control requesting resumption of execution of the task;

configuring a second execution environment instance according to the debugging snapshot; and in response to the input being received subsequent to the threshold period of time elapsing, resuming execution of the task in the second execution environment instance configured according to the debugging snapshot.

16. The one or more non-transitory computer-readable media of claim 15, wherein the one or more criteria are included in a request to execute the task on the serverless computing system.

17. The non-transitory computer-readable media of claim 15, wherein the one or more criteria are obtained from the serverless computing system.

18. The one or more non-transitory computer-readable media of claim 15, wherein the execution of the task comprises execution of the task for a specified length of time, wherein the specified length of time comprises a time limit imposed by the serverless computing system.

* * * * *